Figure 1:
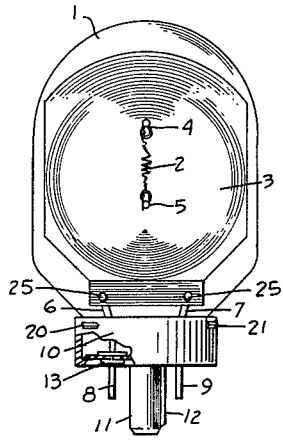

Dec. 22, 1964  R. F. SCOLEDGE ETAL  3,162,785
PROJECTION LAMP
Filed April 22, 1960

ROBERT F. SCOLEDGE
ROBERT M. SHIMER JR.
*INVENTORS*

BY Lawrence Burns,
ATTORNEY

United States Patent Office 3,162,785
Patented Dec. 22, 1964

3,162,785
PROJECTION LAMP
Robert F. Scoledge, Danvers, and Robert M. Shimer, Jr., Hamilton, Mass., assignors to Sylvania Electric Products Inc., a corporation of Delaware
Filed Apr. 22, 1960, Ser. No. 24,101
5 Claims. (Cl. 313—113)

This invention relates to projection lamps, that is to lamps used in picture projectors and similar devices.

Such lamps have a light-emitting element, such as an incandescent filament, and generally a reflector in association therewith, the light-emitting element and the reflector usually being enclosed in the same light-transmissive envelope, such as a tubular glass lamp bulb.

The emitted light is focussed by the reflector on a so-called "film gate" at which a transparent image is placed to be projected onto a screen. If the light-emitting element is a filament, it is focussed in a diffusing manner on the film gate to give a fairly uniform illumination over the area of said gate. A sharp image of the filament on the film gate would be ineffective and would not illuminate the gate properly.

The usual metal reflector will focus not merely light, but also heat, upon the film gate, and since over 90% of the radiation from the filament will usually be heat radiation, the temperature of the film or the like at the gate can become very high; and even if a motion picture film is used, and each section of it passes quickly by the gate, it may still burn in some cases, especially if the film happens to stop for a moment accidentally.

The applicants have discovered, however, that a reflector of the interference filter type can be used in such a lamp to reflect the light from the filament without reflecting the infra-red or heat radiation, thereby insuring that the latter will not be reflected onto the film at the gate to cause heating thereof. In that way, more light can be reflected onto the film gate, increasing the brightness of the resultant screen image, without seriously increasing the heating effect on the film or slide used.

A suitable reflector of this type can be made by vacuum-depositing on a glass piece alternate layers of magnesium fluoride and zinc sulfide, one over the other and each having a thickness of one quarter of the wavelength of the light to be reflected, the wavelength generally being taken in the green or yellow. Other materials can be used in the layers, the purpose of which is to produce an interference pattern which varies in such a manner with the wave length of the incident radiation, that the infrared radiation is transmitted, but most of the visible light is reflected. Such interference filters are sometimes called dichroic reflectors.

Because the resultant coating has a high resistance, the support wires for the filament can generally be run right through, and mechanically secured to, the coated glass piece, without any insulating backings.

Figure 2:
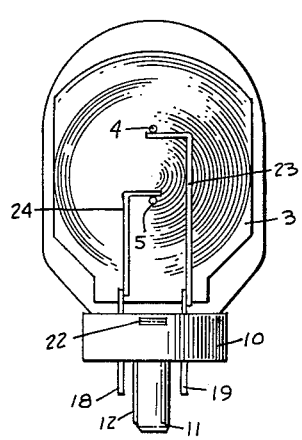
Figure 3:
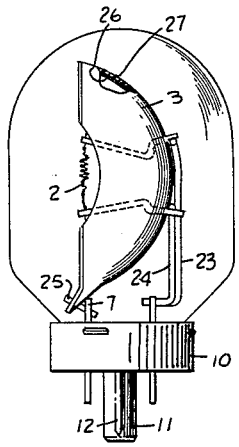
Figure 4:
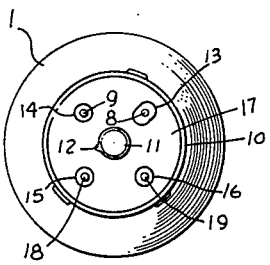

Other features, advantages and objects of the invention will be apparent from the following description taken in connection with the accompanying drawing in which:

FIGURE 1 is a front view of a lamp according to the invention;
FIGURE 2 is a back view of said lamp;
FIGURE 3 is a side view of the lamp; and
FIGURE 4 is a bottom view of the same lamp, showing the arrangement of the base.

In FIGURE 1, the generally tubular lamp bulb 1 encloses a coiled-coil tungsten filament 2 and a dichroic reflector 3 in position to reflect light from said filament to a focus at a point outside bulb 1. The reflector 3 can be ellipsoidal with the filament 2 approximately at one focus, and a film gate or some other device with which the lamp is to be used, at the other focus.

The filament can be as shown in U.S. patent application Serial No. 5,867 filed February 1, 1960, by R. F. Scoledge and S. S. Davis. It can be placed parallel to the axis of the lamp bulb 1, as shown in the present application, at right angles to that axis as shown in said application Serial No. 5,867, or at some other angle. If desired, the filament can be placed with the axis of its coil along the axis of the reflector.

The reflector is supported by the lead-in wires 4, 5 which extend through it, and also by the support wires 6, 7, the latter being welded to the pins 8, 9 which extend through the glass of the envelope for engagement with a suitable socket. The metal base cup 10 encloses the end of the lamp, and carries the hollow cylindrical pin 11 for engagement with a suitable socket, said pin carrying the key 12 for aligning the base in a socket. As shown in the cutaway section of FIGURE 1 and in the bottom view of FIGURE 4, the glass nubs 13, 14, 15, 16 extend through holes in the bottom 17 of the metal base 10, insulating the lead-in pins 8, 9, 18, 19, which pass therethrough, and aiding in positioning the base 10 on the bulb 1.

The base 10 carries the projections 20, 21, 22 on its cylindrical walls for cooperation with a socket such as that shown in the copending application Serial No. 553,367, filed December 15, 1955, by William H. Morgan, Jr., now abandoned.

The rear of the lamp is shown in FIGURE 2. The filament support wires 4, 5, which extend through the reflector 3 are welded to further support wires 23, 24, which are welded to the contact pins 18, 19, which extend to the exterior of the lamp for engagement with contacts in a suitable socket, such as that in the application mentioned above. A coating of powdered zirconium can be painted onto the lead-in wires 8, 9, 18, 19, preferably near and around the welded joints, if desired, to act as a getter. The zirconium powder can be applied in a suitable vehicle such as amyl acetate, which will evaporate and leave the zirconium powder present. About .002 gms. of zirconium can be used on each contact pin. The coating of zirconium is omitted in the drawings for convenience.

The positioning of the filament 2 in the reflector 3 is shown in FIGURE 3, the rounded edges of the reflector being cut away where they approach the sides of the tube, so that a larger radius of curvature can be used than if the reflector was designed to have a circular perimeter. The portion of the reflector connected to the support pins 8, 9, is in the form of a tube 25 extending from the reflector.

The lamp is generally filled with an inert gas such as argon or a gas inert with respect to the filament, such as nitrogen, at a pressure above atmospheric, and sealed off through an exhaust tubulation, which after being sealed is enclosed in the hollow cylindrical pin 11 for protection against breakage.

For use with a 16 mm. motion picture film at a standard film gate, the enclosing tube can have a diameter of 1¾ inch, and the reflector an internal depth on the concave side of about 0.580 inch from the circular perimeter of the mirror to the apex. The center of the longitudinal axis of the coil is 0.410 inch from the apex of the mirror. The apex is taken on the reflecting side of the mirror. The filament can be designed for operation at 21.5 volts and about 11.7 amperes, or at some other convenient input. The power taken to illuminate a 16 mm. film will be about 250 watts to give 800 screen lumens under standard conditions.

The reflector 3, as indicated in FIGURE 3, is a series of alternate coatings 26 of magnesium fluoride and zinc sulfide on a glass piece 27, the thickness of each layer being that of a quarter of the wavelength of the light, say of 5000 Angstroms wavelength, that it is desired to reflect. The coatings can be applied by placing the glass piece in a vacuum in a bell jar and flashing onto it, in vacuum, the various layers of the compounds used, in accordance with known methods of vacuum deposition.

Other interference filter reflecting layers can be used, if desired, for example, successive layers of silicon dioxide and titanium dioxide.

What we claim is:

1. An incandescent projector lamp comprising an incandescible filament, an interference filter in back of and in reflecting relationship to said filament to reflect visible light directly through the forward portion of the lamp and transmit infra-red radiation, and an enclosing light-transmitting envelope around said element and said reflector to seal said filament and said reflector from the external atmosphere and in fixed alignment with each other, and a gas filling in said envelope, said gas being inert.

2. The lamp of claim 1, in which the interference filter is a concave glass piece having a plurality of alternate thin layers of different materials deposited thereon, each layer having a thickness of one-quarter wavelength of the light to be reflected.

3. An incandescent projector lamp comprising an incandescible coiled tungsten filament, an interference filter in back of and in reflecting relationship to said filament to reflect visible light and transmit infra-red radiation, said filter having a plurality of alternate layers of zinc sulfide and magnesium fluoride, an enclosing light-transmitting envelope around said element and said reflector to seal said filament and said reflector from the external atmosphere and in fixed alignment with each other, and a filling in said envelope of gas inert with respect to said filament, said reflector being in position to reflect visible light through a forward portion of said envelope.

4. The lamp of claim 3, in which the envelope is tubular, and the interference filter is arranged to reflect light through the side of said tubular envelope.

5. The lamp of claim 3, in which the gas contains nitrogen.

References Cited in the file of this patent

UNITED STATES PATENTS

| | | |
|---|---|---|
| 1,425,967 | Hoffman | Aug. 15, 1922 |
| 2,181,295 | Riggs et al. | Nov. 28, 1939 |
| 2,466,430 | Hutchinson | Apr. 5, 1949 |
| 2,519,722 | Turner | Aug. 22, 1950 |
| 2,552,184 | Koch | May 8, 1951 |
| 2,798,943 | Prideaux | July 9, 1957 |
| 2,799,791 | Honing et al. | July 16, 1957 |
| 2,852,980 | Schroder | Sept. 23, 1958 |
| 2,859,369 | Williams et al. | Nov. 4, 1958 |
| 2,979,634 | Peek et al. | Apr. 11, 1961 |